United States Patent
Du Plessis et al.

(10) Patent No.: US 7,094,472 B2
(45) Date of Patent: Aug. 22, 2006

(54) RADIATION TREATED ETHYLENE POLYMERS AND ARTICLES MADE FROM SAID POLYMERS

(75) Inventors: Tjaart Andries Du Plessis, Pretoria (ZA); Song Cheng, East Windsor, NJ (US); Horst Seute, Pretoria (ZA)

(73) Assignees: Ion Beam Applications, S.A., Louvain-la-Neuve (BE); Gammatron Pty LTD, Pretoria (ZA)

( * ) Notice: Subject to any disclaimer, the term of this patent is extended or adjusted under 35 U.S.C. 154(b) by 32 days.

(21) Appl. No.: 10/686,779

(22) Filed: Oct. 17, 2003

(65) Prior Publication Data

US 2004/0132854 A1    Jul. 8, 2004

Related U.S. Application Data

(63) Continuation-in-part of application No. 10/475,129, filed on Apr. 21, 2004, now abandoned.

(30) Foreign Application Priority Data

Apr. 19, 2002 (ZA) .................................... 02/3121
Apr. 19, 2002 (ZA) .................................. 2002/3121
Apr. 17, 2003 (ZA) .................... PCT/ZA03/00053

(51) Int. Cl.
   C08J 3/28      (2006.01)
   B32B 27/16     (2006.01)
   B32B 27/32     (2006.01)
   C08F 110/02    (2006.01)
   B29D 23/00     (2006.01)

(52) U.S. Cl. ................... 428/461; 428/523; 428/462; 428/500; 428/35.7; 428/36.9; 522/161; 526/352; 526/352.8

(58) Field of Classification Search ............... 522/161; 428/461, 523; 526/352, 348
See application file for complete search history.

(56) References Cited

U.S. PATENT DOCUMENTS

| 3,130,139 | A |   | 4/1964  | Harper et al. ............... 204/154 |
|-----------|---|---|---------|--------------------------------------|
| 3,362,897 | A | * | 1/1968  | Lawton ....................... 522/161 |
| 3,899,807 | A | * | 8/1975  | Sovish et al. ................ 24/20 R |
| 4,332,655 | A | * | 6/1982  | Berejka ....................... 525/211 |
| 4,525,257 | A | * | 6/1985  | Kurtz et al. ................. 522/158 |
| 4,586,995 | A |   | 5/1986  | Randall et al. ................. 522/5 |
| 4,935,079 | A | * | 6/1990  | Nelson-Ashley et al. ...... 156/82 |
| 5,176,872 | A | * | 1/1993  | Lucas et al. ................. 264/532 |
| 5,266,607 | A | * | 11/1993 | Lucas et al. ................... 522/76 |
| 5,952,396 | A | * | 9/1999  | Chang ........................... 522/1 |
| 6,114,486 | A |   | 9/2000  | Rowland et al. ............ 526/352 |
| 6,168,626 | B1| * | 1/2001  | Hyon et al. ............... 623/18.11 |
| 6,174,569 | B1| * | 1/2001  | Blomer et al. ............... 427/410 |
| 6,500,540 | B1| * | 12/2002 | Langohr et al. ............. 428/364 |
| 6,663,974 | B1| * | 12/2003 | Kelch et al. ............... 428/461 |
| 6,692,679 | B1| * | 2/2004  | McNulty et al. ............ 522/161 |
| 6,818,172 | B1| * | 11/2004 | King et al. ................. 264/479 |
| 2003/0093156 | A1 | * | 5/2003 | Metzger et al. .......... 623/20.15 |

FOREIGN PATENT DOCUMENTS

| EP | 0 047 625 | 3/2002 |
| ZA | 831896    | 3/1983 |
| ZA | 896852    | 9/1989 |
| ZA | 926738    | 9/1992 |
| ZA | 989245    | 10/1998 |

\* cited by examiner

*Primary Examiner*—Susan Berman
(74) *Attorney, Agent, or Firm*—Mathews, Shepherd, McKay & Bruneau, P.A.

(57) ABSTRACT

The invention relates to ethylene polymers that are modified by ionizing radiation, prior to article formation, at a temperature less than the crystalline melt temperature and preferably under ambient atmosphere, as well as articles made from said polymers. The irradiated ethylene polymers exhibit enhanced melt strength, tensile strength, impact resistance, tear strength, adhesion to polar substances and thermal stability, decreased elongation, and lower melt flow index, but are easily processed and converted into and onto articles by conventional technologies including injection molding, extrusion, film and bottle blowing and powder coating.

8 Claims, 7 Drawing Sheets

Figure 1:
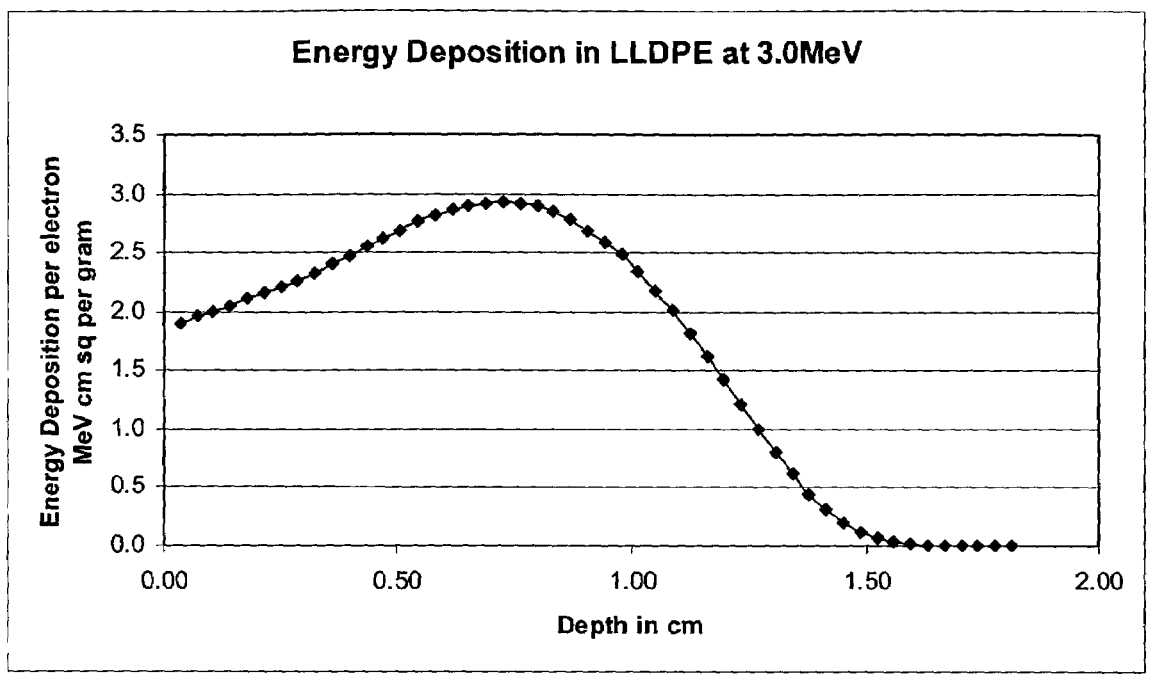

Energy Deposition Curve For A LLDPE With A Density Of 0.92 g/cm³ Using A 3 MeV Electron Beam Accelerator Spiral Flow And Melt Flow Index Versus Degree Of Crosslinking Weight-Average Molecular Weight Of A60-70-162 Versus Surface Dose Melt flow Index of A60-70-162 Versus Surface Dose LAOS Curves For Irradiated And Un-Irradiated DMDA 8007

FTIR Spectra For Irradiated And Un-Irradiated DMDA 8007

Melt flow index of Dowlex 2045G vs. surface dose

US 7,094,472 B2

RADIATION TREATED ETHYLENE POLYMERS AND ARTICLES MADE FROM SAID POLYMERS

1.0 RELATED APPLICATIONS

This application is a continuation-in-part of U.S. patent application Ser. No. 10/475,129 (now abandoned), entitled "Method of Increasing The Hydrostatic Stress Strength Of A Polymer," filed on Apr. 21, 2004, which is the national stage of PCT Application No. PCT/ZA03/00053, of the same title, filed Apr. 17, 2003, which designates the United States and claims priority to South African Application No. ZA 2002/3121, filed Apr. 19, 2002. The entire content of the aforementioned documents is incorporated by reference.

2.0 BACKGROUND OF THE INVENTION

2.1 Field of the Invention

The invention relates to irradiated ethylene polymers and articles made using said polymers. More specifically, the invention relates to ethylene polymers that are modified by ionizing radiation, in air, at a temperature less than the crystalline melt temperature of the polymer, prior to article formation, as well as articles made from said polymers.

2.2 Related Art

Polyethylene is one of the most widely used commercial synthetic thermoplastic polymers. Polyethylene is inexpensive, easy to process and convert into articles, tough and flexible. In addition, polyethylene is a good electrical insulator over many frequencies. Polyethylene also exhibits better chemical resistance, including moisture stability, than other commercial plastics including nylon. Furthermore, thin films of certain grades of polyethylene are transparent. Polyethylene also exhibits excellent physiological compatability characteristics.

The commercial importance of polyethylene is enhanced by the wide variety of grades that exist, each having different physical properties and, therefore, different end-use applications. Polyethylene can be coated onto, or formed into, a wide variety of products using conventional conversion technologies such as extrusion, injection molding, cast molding, film and bottle blowing and powder coating.

Despite its popularity, polyethylene has several shortcomings. For example, polyethylene has relatively low mechanical properties (e.g., tensile strength, impact strength, flexural modulus, hydrostatic stress strength, etc.), poor environmental stress crack resistance (ESCR), low service temperature, and relatively poor adhesion to polar surfaces.

Crosslinking polyethylene is well known. For example, it is known to crosslink polyethylene with chemicals, e.g., peroxides, silane and/or multi-functional (meth) acrylates. Alternatively, it is known to crosslink polyethylene with ionizing radiation, e.g., using electron beam or gamma radiation.

Irradiating artifacts formed from polyethylene to improve mechanical properties and thermal stability is known. Such artifacts include polyethylene coated cables and wires, underfloor hot water piping, heat shrinkable polyethylene films, and polyethylene foams, gaskets and o-rings. Generally, a high degree of crosslinking (e.g., 60–70% gel content) is imparted by such processes.

However, there has been little research and development on, and much less commercialization of, polyethylene resins crosslinked by ionizing radiation prior to artifact formation. One reason for this lack of research is the understanding that high levels of crosslinking drastically decreases melt flow, making the polymer difficult to process and convert into artifacts. To the extent that irradiated ethylene polymers are discussed in the prior art, the irradiation of the polymer is generally done under non-ambient atmosphere and/or above the crystalline melt temperature and steps are generally taken to insure an extremely low gel content (e.g., below 0.5% by weight).

For example, U.S. Pat. No. 4,586,995 ("the '995 patent") discloses "a novel polymer and polymer treatment method . . . [which] involves irradiation of a polymer under non-gelling conditions at a temperature above the polymer melting temperature and in the absence of oxygen." See the '995 patent, abstract (emphasis added). The '995 patent, therefore, teaches away from processes that irradiate polymers under gelling conditions and/or at temperatures below the crystalline melt temperature and/or under unmodified atmosphere.

As further example, U.S. Pat. No. 6,114,486 ("the '486 patent") relates to "a rheology-modified ethylene polymer having less than 0.5 weight percent gel . . . which is characterized as having improved rheological performance and/or melt strength attributes relative to the unmodified polymer." See the '486 patent abstract (emphasis added). "The rheology . . . is modified . . . by treating the ethylene polymer in the presence of a crosslinking agent in an amount . . . less than the amount which would cause more than 0.5 wt % gel formation . . . Crosslinking agents include peroxide compounds, and other known heat-activated curing agents, such as azo compounds, and electron beam, gamma-ray, and other known radiation cure systems." Id. at col. 13 lines 10–20. When radiation is used, "[t]he amount of energy used to modify the polymer is preferably at least 0.5 Mrad [5 kGy] . . . and typically up to 50 Mrads [500 kGy]." Id. at col. 14 lines 9–12. "The irradiation intensity is . . . adjusted to avoid substantial heating of the polymer, because that might cause the polymer to react with oxygen . . . unless additional measures are taken to prevent contact with oxygen." Id. at col. 14 lines 18–25.The '486 patent, therefore, fails to recognize any benefit of crosslinking polymers with radiation versus chemical crosslinking, much less the benefits achieved using the irradiation conditions set forth herein, and also teaches away from the modification of polymers to contain any significant amount of gel or any significant reaction with oxygen.

In addition, European Patent Application No. 0047625 ("EPA '47625") describes a process whereby "[a] blend of polyethylene having a density in the range of 0.935–0.948 g/cm³ and 1–3%, by weight, of carbon black and which has been irradiated in an inert atmosphere while in the form of granules, is fed to an extruder, extruded in the form of pipe and cooled." See EPA '47625 abstract (emphasis added). "In a preferred embodiment the granules of polyethylene have been subjected to irradiation in an amount in the range of 0.05–0.75 Mrad [0.5–7.5 kGy] of irradiation and particularly 0.3–0.7 [3–7 kGy] of irradiation." Id. at 4 lines 27–30. "Gel formation, on irradiation, in amounts of more than 0.1% by weight, is outside the scope of this invention in the unlikely event that it should occur." Id. at 5lines 5–8. EPA '47625, therefore, teaches away from the irradiation of polyethylene under ambient atmosphere, teaches away from the irradiation of polyethylene in the absence of carbon black, teaches away from the generation of polyethylene with a gel content greater than 0.1% by weight and, finally, fails to recognize the benefits achieved using the irradiation conditions set forth herein.

Similarly, U.S. Pat. No. 3,130,139 (the '139 patent") describes a method whereby "a uniform dispersion of carbon black in polyolefins is obtained by subjecting the polymer to ionizing radiation prior to its admixture with the carbon black." See the '139 patent col. 1 lines 41–45. "As little as 0.0005 megarad [0.005 kGy] . . . is effective to improve the uniformity of dispersion of carbon black in polyolefins. As much as 10 megarads [100 kGy] or more of ionizing radiations can be used for purposes of the present invention." Id. at col. 2 lines 10–15. The '139 patent fails to recognize the benefits obtained from irradiating polyethylene under the conditions set forth herein and, instead, utilizes a broad range of doses to further the dispersion of a single filler, carbon black, that is neither required nor preferred herein.

Finally, Great Britain Pat. No. 831,896 ("GB '896") "[r]elates to the production of heat treated irradiated polymeric materials and blends of such materials with fillers." See GB '896 p. 1 lines 10–12. The method comprises "subjecting a polymer of at least one 1-olefin . . . to a dosage of from $10^5$ to $10^{11}$ roentgens [roughly 1 kGy to 1,000,000 kGy] of radiation, and thereafter heating the irradiated polymer to a temperature above its softening point." Id. at p. 1 lines 49–59. "[T]he resulting product exhibits an increase in elongation and a decrease in stiffness, density and tensile strength over that of either the un-irradiated or irradiated starting polymer." Id. at p.1 lines 19–24 (emphasis added). In the sole example, "test specimens were placed in aluminum cans which were swept out with nitrogen and then irradiated . . . ." Id. at p. 3 lines 112–115. GB '896 teaches away from the irradiation of polyethylene under ambient atmosphere and teaches away from benefits, such as increased tensile strength, obtained using the irradiation conditions described herein.

The inventors listed on this application have received prior patents relating to polymer irradiation including the following: South African Pat. No. 89/6852 ("S.A. 89/6852") entitled "Crosslinking of Polymeric Materials," South African Pat. No. 92/6738 ("S.A. 92/6738") entitled "Process For Coating A Substrate With A Film Of Thermoplastic Polymeric Material; and South African Pat. No. 98/9245 ("S.A. 98/9245") entitled "Crosslinking Of Polymeric Materials." In general, these patents are directed toward the use of multi-functional crosslinking agents in conjunction with irradiation. Furthermore, these patents fail to recognize the revolutionary impact of carefully controlled irradiation on the properties of polyethylene feedstock.

3.0 SUMMARY OF THE INVENTION

In the present invention, partial crosslinking, branching and oxidation in polyethylene resins having a crystalline and an amorphous phase, prior to the formation of artifacts, is induced using ionizing radiation at a temperature where both the crystalline and the amorphous phases are present. Preferably, the irradiation is carried out in air and thus in the presence of oxygen.

Irradiation under the conditions described herein induces a low degree crosslinking, long chain branching and oxidation in the polymer. The irradiated polyethylene exhibits enhanced mechanical properties—including thermal stability and improved processability. For example, the irradiated polyethylene exhibits increased melt strength, tensile strength and heat deflection temperature, decreased elongation at break, often exhibits improved notched impact strength and, furthermore, possesses improved compatibility with other materials (such as fillers) as well as improved adhesion to other materials (such as metal surfaces). These benefits are achieved without destroying the ability to process and convert the polyethylene into artifacts. Specifically, although the melt flow index of the polyethylene drops with increasing dose, the irradiated polymer feedstock remains easy to process and convert. Conversion of the irradiated polyethylene can be accomplished, optionally after combination with additives, by a wide range of conversion technologies, e.g., extrusion, molding, film blowing and powder coating.

The degree of crosslinking within the polyethylene resin is controlled by radiation dose, i.e., energy absorbed by the irradiated polymer per unit mass (a common unit is kGy, and 1 kGy=1 kJ/kg). Ideally, the dose uniformity ratio (ratio of maximum does to minimum dose within the resin) ranges from 1.2 to 3.0 and, more preferably, ranges from 1.2 to 1.8. The distribution of the dose within the material is also controlled.

While it is known to use radiation to impart a high degree of crosslinking (e.g., 60–70% gel content) to improve the material properties of formed parts, the method of this invention achieves similar results using a much lower degree of crosslinking (e.g., 0.01–8% gel content) imparted prior to part formation. Preferably, the gel content ranges from 0.2 to 8%. More preferably, the gel content ranges from 0.75 to 8%. Ideally, the gel content ranges from 0.75% to 6.0%. This is accomplished by applying low doses of radiation to the polymer, e.g., from 1 to 60 kGy, preferably from 8 to 30 kGy. In the case of electron beam, these doses are surface doses. In the case of gamma ray and X-ray, these doses are the minimum absorbed doses.

Preferably, the irradiation is conducted in an unmodified atmosphere and thus in the presence of oxygen. It has been found that irradiation under these conditions imparts superior compatability and adhesion properties to polyethylene. Thus, the modified polyethylene can be more easily blended with polar additives and more easily adhered to polar surfaces including metal (e.g., steel) surfaces, concrete, timber and polar plastics.

Electron beam, gamma ray and X-ray are all suitable forms of irradiation for use in the invention. While gamma ray and X-ray have better penetration depth, electron beam generally has higher dose rates which can lead to higher throughput, thus tending to be more economical.

Other aspects of the invention will be apparent to those of ordinary skill in the art in view of the disclosure provided herein.

4.0 BRIEF DESCRIPTION OF THE DRAWINGS

FIG. 1 provides an energy deposition curve for a linear low density polyethylene (LLDPE) with a density of 0.92 g/cm$^3$ irradiated using a 3 MeV electron beam accelerator.

Figure 2:
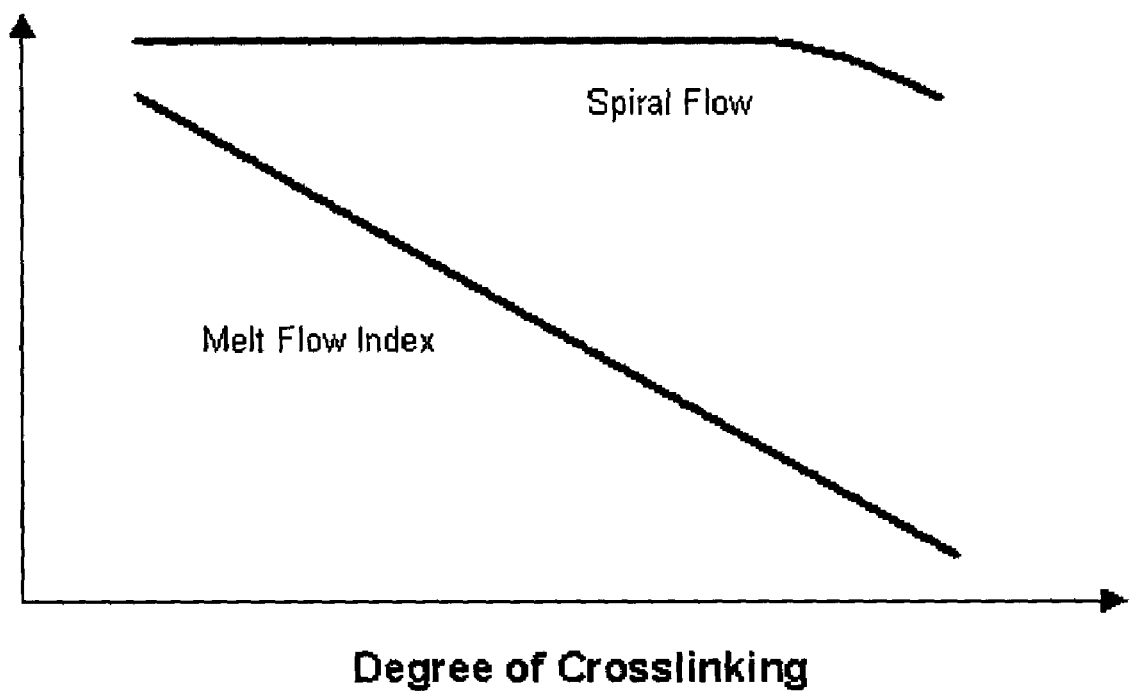

FIG. 2 illustrates the general impact of radiation induced crosslinking and long chain branching on the melt flow index and spiral flow of polyethylene.

Figure 3:
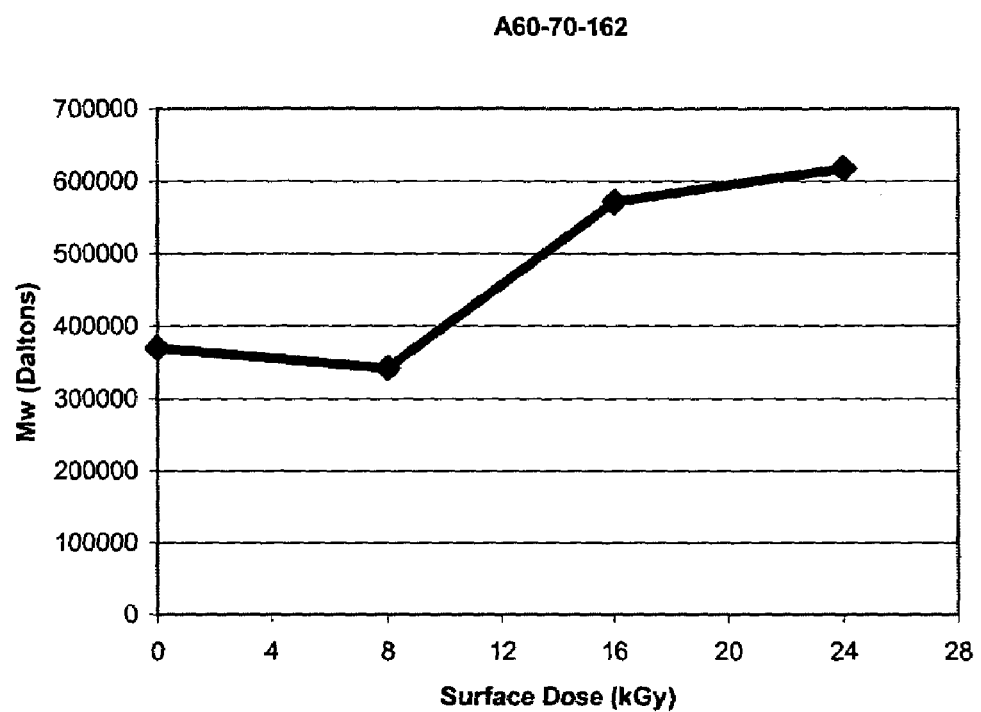

FIG. 3 plots the weight-average molecular weight ($M_w$) of a irradiated high density polyethylene (HDPE) versus surface dose.

Figure 4:
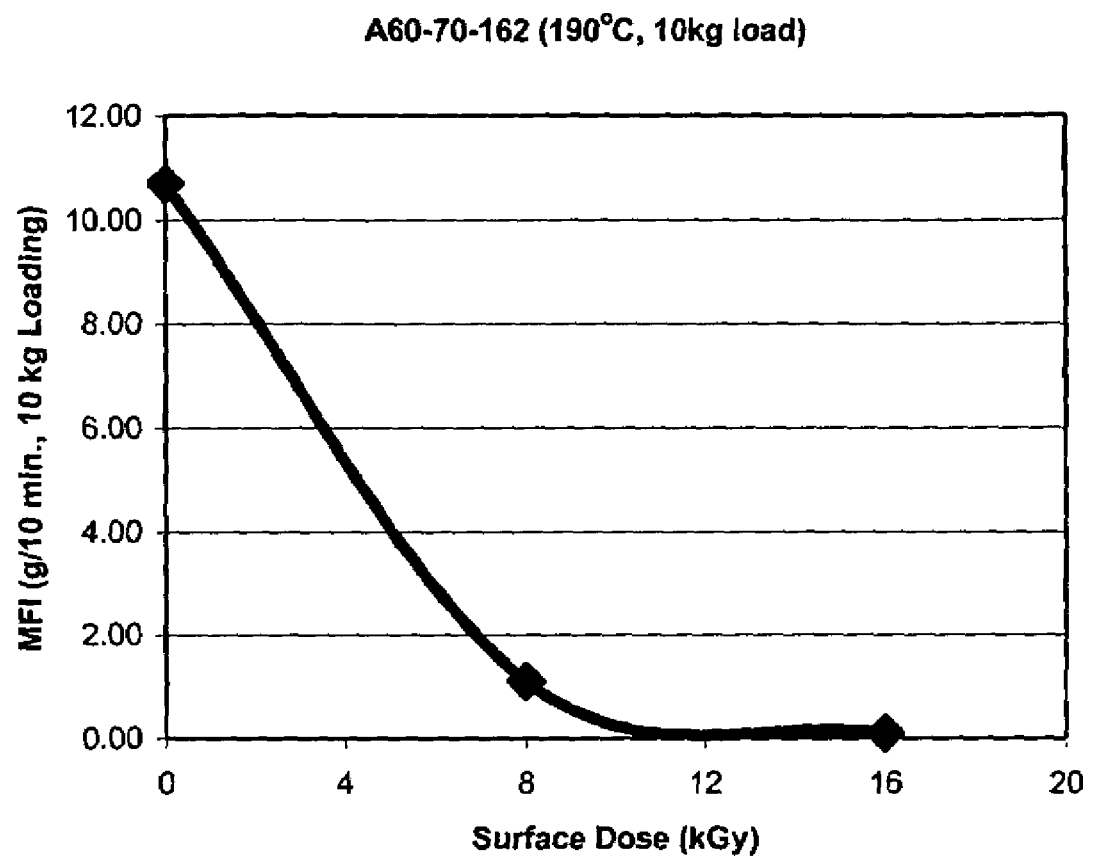

FIG. 4 plots the melt flow index of irradiated HDPE versus surface dose.

Figure 5:
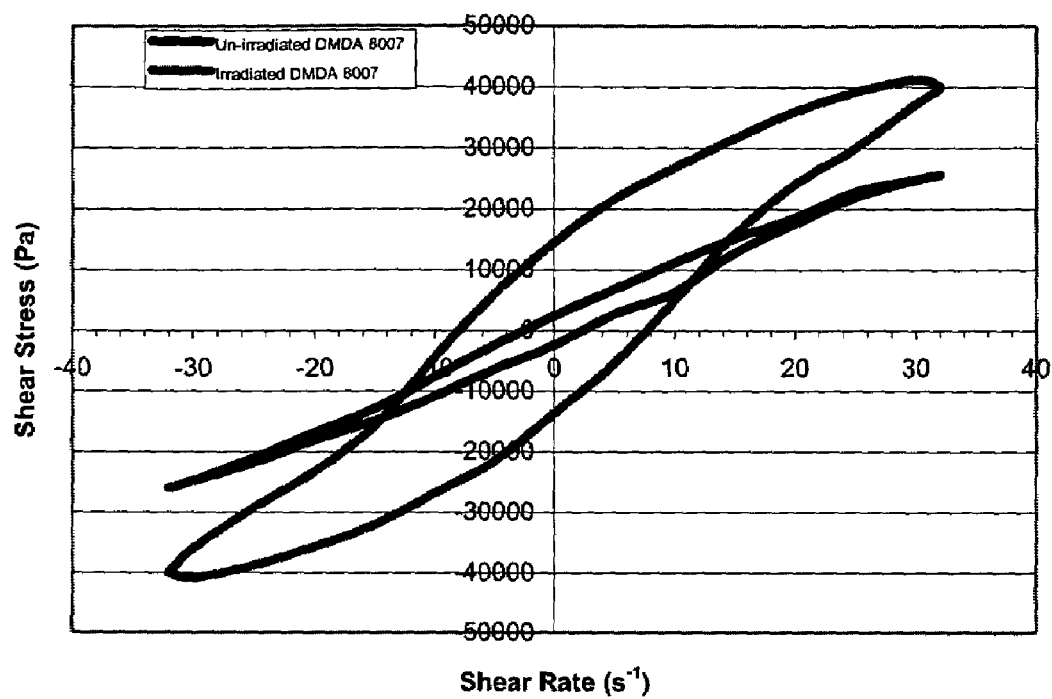

FIG. 5 provides Large Amplitude Oscillatory Shear (LAOS) curves for irradiated and un-irradiated HDPE.

Figure 6:
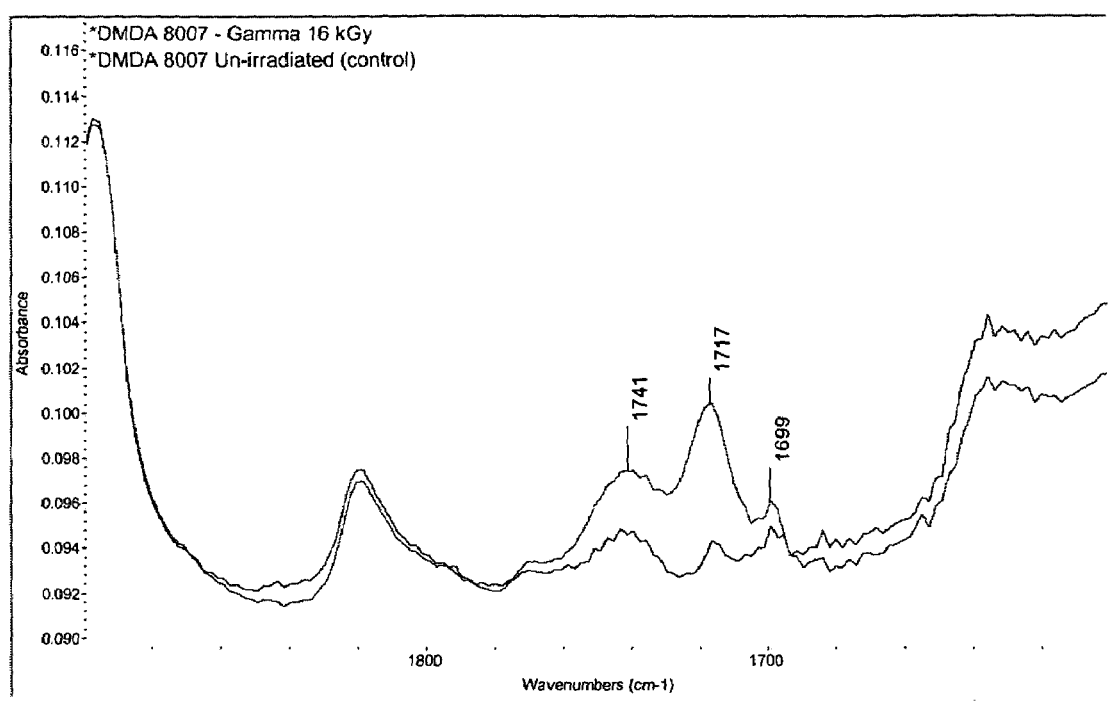

FIG. 6 illustrates a portion of a Fourier Transform Infrared Spectroscopy (FTIR) spectra for an irradiated and un-irradiated HDPE.

Figure 7:
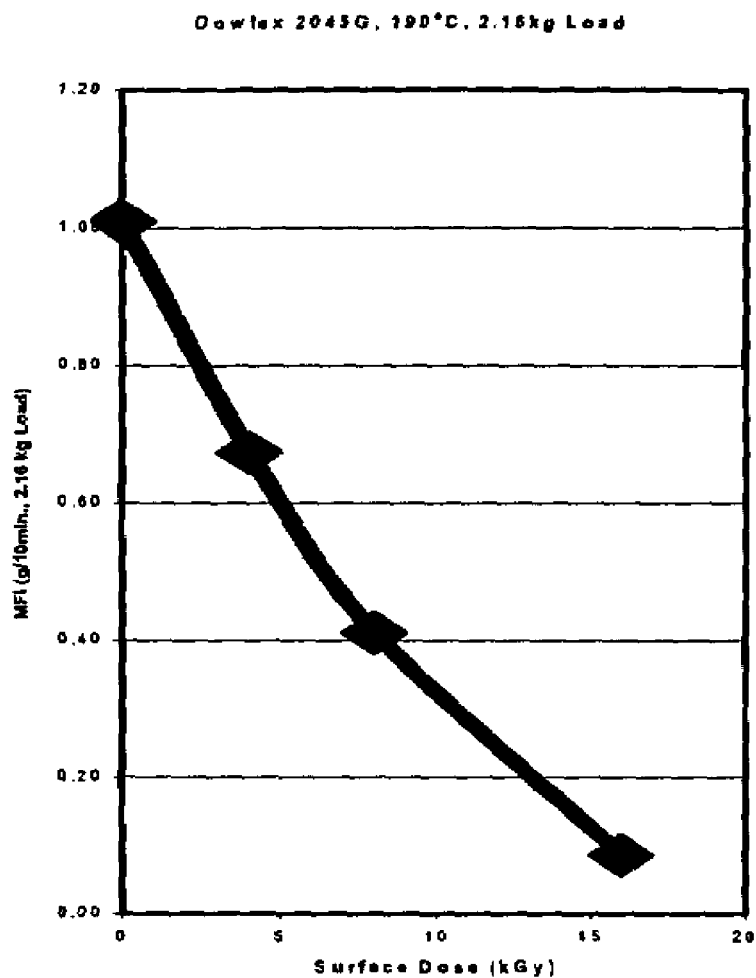

FIG. 7 plots the melt flow index of an irradiated LLDPE versus surface dose.

5.0 DETAILED DESCRIPTION OF THE PREFERRED EMBODIMENTS

5.1 Definitions

As used herein, the following terms are intended to have the following meaning:

"Homopolymer" refers to polymers prepared from one type of monomer.

"Copolymer" and "interpolymer" are used interchangeably to refer to polymers prepared from two or more types of monomers.

"Ethylene polymer" and "Polyethylene" are used interchangeably to refer to polymers that comprise at least 75% by weight units that are derived from ethylene and have the structure $[—CH_2—CH_2—]_n$. Accordingly, the terms ethylene polymer and polyethylene include ethylene homopolymers and ethylene copolymers. Preferably, any co-monomer present is an α-olefin alkene such as 1-butene, 1-hexene, 1-octene and 4-methyl-1-pentene, however, the presence of alternative co-monomers, especially vinyl acetate, is embraced.

"Branching" refers to the formation of shorter "Y-type" or "T-type" side chains within a polymer structure that are attached to the longer backbone. In ethylene polymers, branching is thought to be the result of the molecular addition of one polymer molecule to the backbone of another polymer molecule.

"Oxidation" refers to the radiation-induced formation of functional groups such as carboxylic groups via a peroxide radical mechanism in the presence and with the involvement of oxygen.

"Short chain branching" refers to branches that consist of less than seven carbon atoms. The term, therefore, includes methyl, ethyl, propyl, butyl, pentyl, and hexyl groups that extend off the polymer backbone.

"Long chain branching" refers to branches that consist of seven or more carbon atoms. The term, therefore, excludes methyl, ethyl, propyl, butyl, pentyl and hexyl groups that extend of the polymer backbone.

"Low-density polyethylene" (LDPE) is an ethylene polymer that contains both short and long chain branching. The presence of short and long chain branching interferes with the formation of crystalline regions. Accordingly, LDPE has a relatively low degree of crystallinity which is reflected by a low density. Generally, LDPE has a density under ambient conditions ranging from 0.870 to 0.930 g/cm³. Polyethylenes with densities below 0.910 g/cm³ are sometimes referred to as very or ultra low density polyethylene (VLDPE or ULDPE).

"Linear low density polyethylene" (LLDPE) is an ethylene polymer that contains short chain branching and very little long chain branching. The term "linear" conveys the absence of substantial long chain branching. LLDPE is made by polymerizing ethylene with higher α-olefins. The use of a significant quantity of higher α-olefins (e.g., >1%) promotes short chain branching. 1-Butene is a commonly employed α-olefin co-monomer for this purpose. However, other co-monomers, such as 1-hexene, 1-octene, and 4-methyl-1-pentene can be employed and provide enhanced physical properties at the expense of higher production cost. The presence of short chain branching in LLDPE interferes with the ability of the polymer to crystallize. Accordingly, LLDPE also has a relatively low degree of crystallinity which is reflected by a low density. Generally, LLDPE has a density ranging from 0.870 to 0.940 g/cm³.

"High-density polyethylene" (HDPE) is an ethylene polymer that is relatively free of any kind of branching. The lack of branching permits the polymer to have a higher level of crystallinity than LDPE and LLDPE which is reflected by a higher density. Generally, HDPE has a density ranging from 0.945 to 0.970 g/cm³. Grades of HDPE that have a density below 0.96 g/cm³ are produced using α-olefin co-monomer (e.g., 1-butene and 1-hexene) in very low quantities (e.g., <1%). The use of the second monomer reduces the density by introducing short side chain branching. Such materials, which still exhibit less branching than LDPE and LLDPE are often referred to as medium density polyethylene (MDPE).

"Crosslinking" refers to the formation of "H-type" chains in a polymer molecule, where at least two polymer chains are bound together by one or more bridges formed by a reacted element, group or compound. Increased crosslinking results in the formation of increased amounts of gel. As used herein, no distinction is made between intermolecular crosslinking and intramolecular crosslinking.

"Gel" refers to an insoluble three-dimensional polymer network formed by crosslinking and/or branching. Gels are insoluble, even in solvents that dissolve the un-crosslinked polymer.

"Gel fraction," also known as "gel content," is a measure of the amount of gel in a polymer. Unless otherwise specified, gel fraction is determined by ASTM D-2765, the entire content of which is incorporated by reference. Gel fraction is expressed in terms of weight percent gel based on the total weight of the polymer.

"Number average molecular weight" ($M_n$) is one way of determining the molecular weight of a polymer. The number average molecular weight is the common average of the molecular weights of the individual polymers and is calculated in the conventional manner, namely, measuring the molecular weight of a number (N) of polymer molecules, summing the weights (M), and dividing by the total number of polymer molecules, i.e., $M_n = \Sigma_i N_i M_i / \Sigma_i N_i$. $M_n$ is more sensitive to low molecular weight species than other measures of molecular weight. Unless otherwise specified, $M_n$ is measured by gel permeation chromatography.

"Weight average molecular weight" ($M_w$) is another measure of the molecular weight of a polymer. Weight average molecular weight is calculated in the conventional manner, namely, by weighing a number (N) of polymer molecules, adding the squares of the weights (M), and dividing by the total weight of the molecules, i.e., $M_w = \Sigma_i N_i M_i^2 / \Sigma_i N_i M_i$. $M_w$ is more sensitive to higher molecular weight species than $M_n$. Unless otherwise specified, $M_w$ is measured by gel permeation chromatography.

"Molecular weight distribution" (MWD), also known as "molar mass distribution" and "polydispersity," is the uniformity of the chain length as calculated by the following formula: $M_w/M_n$.

"Density" is a measure of mass per unit volume of material. Unless otherwise specified, density is measured in accordance with ASTM D-1505, the entire content of which is incorporated by reference.

"Melt flow index" (MFI), also known as melt index (MI) is the flow rate of polyethylene under set conditions. The melt flow rate (MFR) is the ratio of two different melt-flow indices using different loads in the determinations. Unless otherwise specified, melt flow index is measured in accordance with ASTM D-1238 at 190° C. and 2.16 kg load (formerly known as Condition E), the entire content of which is incorporated by reference.

"Melt strength" is the tensile stress needed to break a polymer melt during draw down. A high melt strength is needed for processes such as blow molding where the melt is required to hold die shape and not sag after the melt leaves the die.

"Melt temperature" is the temperature of a material being melt processed.

"Tensile strength" is the maximum tensile stress that can be sustained by a material under set conditions prior to a designated event (e.g., yield or break). Unless otherwise specified, tensile strength is measured in accordance with ISO 527, the entire content of which is incorporated by reference.

"Elongation" is the degree of stretching, expressed as a percentage, that occurs under set conditions at a designated point (e.g., yield or break). Unless otherwise specified, elongation is measured in accordance with ISO 527, the entire content of which is incorporated by reference.

"Izod notched impact strength" is a measure of the impact resistance of a thermoplastic as measured by a pendulum impact machine under set conditions. Unless otherwise specified, Izod notched impact strength is measured in accordance with ISO 179, the entire content of which is incorporated by reference.

"Shore D hardness" is a measure of hardness assessed by a material's resistance to a Type D indentor. Unless otherwise specified, shore D hardness is measured in accordance with ISO 868, the entire content of which is incorporated by reference.

"Flexural strength," also known as "flexural modulus" and "breaking strength," is a measure of the stiffness or rigidity of a material of given dimensions under a given load. Unless otherwise specified, flexural strength is measured in accordance with ISO 527, the entire content of which is incorporated by reference.

"Spiral Flow," generally expressed in length, is a measure of the amount of material that can be injection molded under set conditions prior to setting. Unless otherwise specified, spiral flow is measured in according to ASTM D-3123, the entire content of which is incorporated by reference.

"Service temperature" is the temperature at which a material can be used without serious deterioration of properties such as loss of mechanical properties (and hence deformation, etc.). Heat deflection temperature can be one indicator of service temperature.

"Heat deflection temperature" (HDT), also known as "heat distortion temperature," is the temperature at which a bar of polymer with given dimensions bends a given degree under a given load. Unless otherwise specified, HDT is measured in accordance with ASTM D-648, the entire content of which is incorporated by reference.

"Oxygen induction time" (OIT) is a measure of the ability of atmospheric oxygen to degrade a polymer under set conditions (e.g., elevated temperatures). OIT can be used as an indirect measure of thermal stability. Unless otherwise specified, OIT is measured in accordance with ASTM-3895, the entire content of which is incorporated by reference.

"Tear strength," also known as tear resistance, is the force required to propagate a rip, or tear, in a material, usually expressed as the ratio of the maximum load measured during the test to the specimen thickness. Unless otherwise specified, tear strength is measured in accordance with ASTM D-1922, the entire content of which is incorporated by reference.

"Hydrostatic stress strength" is the tensile stress at which a material fails when it is formed into a pipe and subjected to hydrostatic internal pressure. Unless otherwise specified, hydrostatic stress strength is measured in accordance with ISO 7628 Part 2, the entire content of which is incorporated by reference.

"Unmodified atmosphere" means air. The word "unmodified" in this context conveys that no steps are taken to modify the oxygen content of the air prior to irradiation. However, because gases are consumed and/or released during irradiation induced crosslinking, the air may or may not remain identical to normal air for the geographic region.

5.2 Overview

The invention focuses on the following four aspects for making radiation modified resins for practical applications: (1) selection of the resin; (2) irradiation processing; (3) formulation of the resin with additives; and (4) converting methods.

5.3 Selection of the Resin

There are literally hundreds of commercially available grades of polyethylene that can be employed in the present invention. Each grade varies in density, melt flow index, molecular weight, molecular weight distribution, etc. In addition, polyethylene grades are often created by different polymerization methods using different types and amounts of catalysts and co-monomer. Most commercial grades contain additives (e.g., antioxidants, processing aids, etc.) and the identity and quantity of these additives can vary.

Any commercially available ethylene polymer can be used in the present invention. Preferably, however, the ethylene polymer employed has a density of at least 0.870 g/cm$^3$ and a melt flow index at 190° C. and 2.16 kg load of at least 0.1 g/10 min. By definition, the ethylene polymer employed contains no more than 25% by weight units derived from non-ethylenic co-monomers. Preferably, any co-monomer units present are polymerized α-olefin units, although alternative unsaturated co-monomers, especially vinyl acetate, can also be utilized. More preferably, any co-monomer utilized to polymerize the ethylene polymer is an α-olefin alkene such as 1-butene, 1-hexene, 1-octene and 4-methyl-1-pentene. Ideally, any co-monomer utilized contains no more than eight carbon atoms.

The polyethylene base resin is preferably manufactured using either a high- or a low-pressure, or gas phase polymerization process. Such processes typically use chromium (Cr) or titanium (Ti) based catalysts.

Criteria to be considered in selecting a polyethylene for radiation modification and later use in a given process (e.g., extrusion, injection molding, film blowing, powder coating) include density, melt flow index and mechanical properties, as well as the nature and concentration of additives. In general, ethylene polymers that are preferred for a given process in the absence of radiation modification remain preferred with radiation modification since less radiation treatment is needed to optimize the performance of the resin.

If the polyethylene to be irradiated is intended for use in an extrusion process, HDPE is a preferred selection. Preferably, in such instances, the HDPE has a density ranging from 0.945 to 0.970 g/cm$^3$ and more preferably from 0.960 to 0.970 g/cm$^3$. Preferably, in such instances, the HDPE has a melt flow index at 190° C. and 2.16 kg load that ranges from 0.1 to 2.0 g/10 min and more preferably from 0.1 to 0.2 g/10 min.

If the polyethylene to be irradiated is intended for use in a molding process (e.g., injection molding, blow molding, etc.), HDPE is again a preferred selection. Preferably, in such instances, the HDPE has a density ranging from 0.945 to 0.970 g/cm$^3$ and more preferably from 0.950 to 0.965 g/cm$^3$. Preferably, in such instances, the HDPE has a melt flow index at 190° C. and 2.16 kg load that ranges from 0.5 to 20.0 g/10 min and more preferably from 8.0 to 20.0 g/10 min.

If the polyethylene to be irradiated is intended for use in a film blowing process, LLDPE is a preferred selection. Preferably, in such instances, the LLDPE has a density ranging from 0.870 to 0.940 g/cm$^3$ and more preferably from 0.910 to 0.925 g/cm$^3$. Preferably, in such instances, the LLDPE has a melt flow index at 190° C. and 2.16 kg load that ranges from 0.4 to 10.0 g/10 min and more preferably from 0.7 to 1.2 g/10 min. The LLDPE may, optionally, be blended with LDPE. However, one of the benefits of the invention is that blends of LLDPE and LDPE are no longer necessary to achieve adequate melt strength for the film blowing process.

If the polyethylene to be irradiated is intended for use in a powder coating process, a blend of LLDPE and HDPE is a preferred selection. Preferably, in such instances, the LLDPE has a density that ranges from 0.920 to 0.945 g/cm$^3$ and more preferably from 0.930 to 0.945 g/cm$^3$ and a melt flow index at 190° C. and 2.16 kg load that ranges from 2.0 to 10.0 g/10 min and more preferably from 3.5 to 5.0 g/10 min. Preferably, in such instances, the HDPE has a density that ranges from 0.945 to 0.970 g/cm$^3$ and more preferably from 0.950 to 0.965 g/cm$^3$ and has a melt flow index at 190° C. and 2.16 kg load that ranges from 3.0 to 10.0 g/10 min and more preferably from 4.0 to 6.0 g/10 min. The ratio of LLDPE to HDPE preferably ranges anywhere from 80:20 to 40:60 and more preferably ranges from 65:35 to 50:50.

Although additives may be present in the polyethylene, the polyethylene utilized should contain little chemical crosslinking agent and, preferably, contains no chemical crosslinking agent. In general, chemical crosslinking agents are only useful above the crystalline melt temperature. As set forth later in this application, the irradiation process is preferably conducted below the crystalline melt temperature. Accordingly, little benefit is obtained from the presence of chemical crosslinking agents. Furthermore, the absence of chemical crosslinking agents helps to ensure that articles made from the radiation crosslinked material are fully recyclable and remain so over extended periods of time. The absence of crosslinking agents also makes the polyethylene purer and suitable for food grades.

In addition, the polyethylene should contain as little antioxidant as possible. Preferably, the concentration of any antioxidant present prior to irradiation is no more than 0.06% by weight of the polymer and, more preferably, is no more than 0.04% by weight of the polymer. Radiation tends to deplete the level of any antioxidant present so high concentrations of antioxidant are not particularly beneficial.

The polyethylene selected may be irradiated in any commercially available form. Preferably, the polyethylene is in pellet or powdered form to facilitate continuous irradiation processing.

5.4 Irradiation Processing

Radiation induces the formation of crosslinked networks in polyethylene. As a result, the molecular weight of the polymer increases with increasing dose. In addition, the molecular weight distribution widens, especially in cases where concurrent radiation induced branching occurs. Gels are created. Gel fraction increases with increasing dose and is indicative of an increasing degree of crosslinking.

Radiation induced crosslinking and branching enhances the mechanical properties of the polyethylene including tensile strength and heat deflection temperature and generally causes a decrease in elongation at break. In many cases, the notched impact strength increases dramatically—but such increases are not evident in every case. The temperature resistance, or thermal stability, is also improved. Heat deflection temperature, for example, may be raised, indicating a higher service temperature. Other mechanical and physical properties remain largely unchanged.

Radiation induced crosslinking and branching enhances the melt strength and decreases the melt flow index of polyethylene. For applications such as film blowing, this is especially important.

Radiation induced oxidation improves the compatibility of polyethylene to other materials (such as fillers) and improves the adhesion of polyethylene to polar materials (such as metal surfaces).

The degree of crosslinking within the polyethylene resin is controlled by radiation dose, i.e., energy absorbed by the irradiated polymer per unit mass (a common unit is kGy, and 1 kGy=1 kJ/kg). The distribution of the dose within the material is also controlled.

The required dose, and therefore the imparted degree of crosslinking, branching and oxidation, varies depending on the nature of the resin, any additives therein, and its ultimate intended application (e.g., extrusion, molding, film or bottle blowing or powder coating).

Preferably, the crosslinking degree is relatively low. While it is known to use radiation to impart a high degree of crosslinking (e.g., 60–70% gel content) to formed parts in order to significantly improve the material properties, the method of this invention achieves similar results using a much lower degree of crosslinking (e.g., 0.01–8% gel content) imparted prior to part formation. The gel content preferably ranges 0.2 to 8 % by weight. More preferably, the gel content ranges from 0.75 to 8 % by weight. Ideally, the gel content ranges from 0.75% to 6.0 % by weight.

The requisite degree of crosslinking is accomplished by applying low doses or radiation to the polymer. The specific minimum and maximum permissible absorbed dose is determined by the choice of polymer and the specific additives in the polymer. Preferably, the applied dose ranges from 1 to 60 kGy. More preferably, the applied dose ranges from 4 to 60 kGy. Even more preferably, the applied dose ranges between 8 and 50 kGy. Even more preferably, the applied dose ranges from 8 to 30 kGy and, ideally, between 8 and 16 kGy. In the case of electron beam, these doses are surface doses. In the case of gamma ray and X-ray, these doses are the minimum absorbed doses.

The dose uniformity ratio (ratio of maximum dose to the minimum dose within the resin) is as uniform as possible. Typically, the dose uniformity ranges from 1.0 to 3.0, more preferably from 1.0 to 2.0, and even more preferably from 1.0 to 1.8. A typical dos-uniformity ratio is 1.30. When using electron beam, x-ray or gamma irradiation, the dose uniformity ratio can be as near to 1.0 as desired, by selecting a thin layer of product. Of course, this is at the expense of a lower throughput and loss of energy.

FIG. 1 shows the energy deposition curve for a linear low density polyethylene (LLDPE) with a density of 0.92 g/cm$^3$ irradiated using a 3 MeV electron beam accelerator. The curve was generated by a computer simulation using the Monte Carlo Code ACCEPT of the Integrated Tiger series Version 3 (3). The energy deposition is directly proportional to the absorbed dose. FIG. 1 shows that with the 3 MeV beam energy equal entrance absorbed dose and exit absorbed dose can be achieved and a dose uniformity ratio of 1.45 can be obtained at the penetration depth of 1.2 cm (not including air). The penetration depth will be deeper if higher beam energy is used.

Preferably, irradiation is conducted at temperatures below the crystalline melt temperature. More preferably, irradiation is conducted at a temperature between 10 and 80° C. Even more preferably, irradiation is conducted at ambient temperature—although the temperature of the resin may increase during irradiation. If necessary, sufficient cooling can be provided to maintain a resin temperature at or below 80° C.

The irradiation of polyethylene at a temperature below the crystalline melt temperature imparts unique characteristics to the polyethylene that cannot be achieved using chemically induced crosslinking or irradiation induced crosslinking at or above the crystalline melt temperature. The unique results that are achieved are due to the morphological characteristics of polyethylene. Below the crystalline melt temperature, polyethylene has crystalline regions and amorphous regions. For chemical crosslinking, and irradiation above the crystalline melt temperature, the crystalline regions are destroyed when the polyethylene is heated above the crystalline melt temperature. In the melt phase, only amorphous regions exist so any crosslinking is distributed homogenously throughout the resin. In contrast, when polyethylene is irradiated below the crystalline melt temperature, the crystalline regions remain intact but any crosslinking remains predominantly localized in the amorphous regions of the polymer with little crosslinking in the crystalline phase. This causes a non-homogeneous crosslink distribution within the polymer.

Non-homogeneous crosslinking of polyethylene, predominately localized in the amorphous regions, only slightly impacts melt properties that are largely determined by crystalline regions. For example, while the melt flow index of polyethylene decreases sharply with increasing dose (even with low dose levels), the melt temperature and spiral flow (which is more indicative of flow behavior in converting processes) remain basically unchanged. Non-homogenous crosslinking of polyethylene, predominately localized in the amorphous regions, also permits the polyethylene to remain fully recyclable while, simultaneously, achieving the benefits of partial curing.

FIG. 2 provides a schematic illustration of the impact of radiation induced crosslinking and branching, below the crystalline melt temperature, on polyethylene. FIG. 2 shows a rapid decrease in melt flow index with an increasing dose. FIG. 2 also shows a relatively stable spiral flow as the absorbed radiation dose increases. This is one of many features that are unique to the radiation modified polyethylene resins described herein. Namely, they maintain processability despite a decrease in melt flow index.

Table 1 provides a more specific illustration of the impact of radiation induced crosslinking and branching, below the crystalline melt temperature, on HDPE. The melt flow index was measured according to ASTM D-1238.

TABLE 1

Change In Melt Flow Index And Spiral Flow Of A Modified HDPE

| Absorbed Dose (kGy) | Melt flow index (g/10 min, 190° C., 21.6 kg) | Spiral Flow (cm) |
|---|---|---|
| 8.0 | 5.0 | 26 |
| 16.0 | 3.5 | 26 |
| 24.0 | 1.8 | 24 |

As can be seen in Table 1, there is a marked decrease in the melt flow index with increasing radiation dose, but the spiral flow exhibits little corresponding change.

Preferably, irradiation is carried out in the presence of oxygen. More preferably, irradiation is carried out in an unmodified, and preferably uncontained, atmosphere. Ideally, the oxygen content in the chamber is at least 10%. Due to the release of gases during crosslinking, the atmosphere in the chamber may or may not remain identical to air that is normal for the geographic region. By performing the irradiation in the presence of oxygen, significant savings in equipment and processing costs are realized.

Equally as important, performing the irradiation in the presence of oxygen imparts beneficial properties to the irradiated polyethylene resin. Oxygen in thee air interacts in the free radical mechanism of crosslinking. As a result, peroxide radicals are produced that transform into functional groups, such as carboxylic (—COOH) groups, after subsequent reactions. This radiation-induced oxidation favorably impacts the polymer's comparability and adhesion with polar materials. For example, the introduction of functional groups such as carboxylic groups increases the compatibility of polyethylene resin with polar additives, making it easier to create homogeneous blends containing such additives. In addition, the introduction of functional groups such as carboxylic acid increases the adhesion of the polyethylene resin to other materials with polar characteristics. For applications such as powder coatings, this means that the otherwise non-adhesive hydrophobic resin has natural adhesion to polar metal substrates such as steel, as well as polar plastics.

Electron beam, gamma ray and X-ray are all suitable types of radiation for use in the invention. The useful properties obtained by irradiating polyethylene at a given dose do not vary in any significant degree with the type of ionizing radiation employed. While gamma ray and X-ray have better penetration depth, electron beam generally has higher dose rates which can lead to higher throughput, thus tending to be more economical. Where gamma irradiators and X-ray are more suitable for treating the polymers in closed containers, electron accelerators are more suitable to treating pelletized or powdered polymers in a continuous manner.

Non-ionizing radiation is not suitable for use in the invention. For example, ultraviolet radiation lacks sufficient material penetration capability.

Any known handling system may be employed in conjunction with the radiation source. As known in the art, dose and dose uniformity can be determined, in part, by the speed at which the samples pass through the irradiation chamber and by the orientation of the samples relative to the radiation source. Suitable material handing systems include towlines, tray conveyors, belt conveyors, cart conveyors and overhead chain conveyors, etc. Preferred material handing systems are conveyors that transport trays of material and/or continuous belt conveyors.

5.5 Formulation of the Resin With Additives

Some additives may be present in the polyethylene resin, prior to irradiation, that are consumed by radicals produced during irradiation. Accordingly, additional additives can be incorporated into the polyethylene, after irradiation and prior to processing and conversion, to restore any beneficial properties derived from any depleted additives. Alternatively, additional additives can be added to the polyethylene resin, following irradiation and prior to processing and conversion, simply to incorporate additional beneficial properties not otherwise present. Illustrative additives that may be added after irradiation include pigments (colors), inorganic and organic fillers, antioxidants, UV stabilizers, heat stabilizers, processing aids, impact modifiers, antistatic agents, anti-slip agents, UV absorbers, etc. Preferably, antioxidants are the only additives added after irradiation since it is usually possible, using irradiation, to tailor the mechanical properties of the polyethylene as desired by varying dose.

Antioxidants are often added to the irradiated polyethylene resin to compensate for antioxidant consumed during the irradiation process. This helps to ensure that the long term thermal and oxygen stability of the polymer is not impaired by the irradiation process. For this purpose, any of the various commercially available antioxidants can be used. Preferred antioxidants include Irganox B-225 and Irganox B-900 from Ciba Specialty Chemicals.

Preferably, any additives mixed into the irradiated polyethylene resin are added in the form of a masterbatch, i.e., high additive concentration compounded resins. For this purpose, either the base resin or the irradiated resin can be used to make the masterbatch. To make a masterbatch, a resin is mixed with a relatively high concentration of additive, extruded and pelletized. The total concentration of additives in the masterbatch can range anywhere from 0.1 to 20 weight percent, but preferably ranges from 2 to 5 weight percent. The irradiated resins are mechanically blended with the masterbatch to reach the final desired concentration of additives.

Preferably, the total concentration of additives in the irradiated polyethylene resin, after irradiation and additive addition, ranges from 0.01 to 0.5 weight percent. More preferably, the total concentration of additives in the final feedstock product ranges from 0.01 to 0.4 weight percent. Ideally, the total concentration of additives in the final feedstock product ranges from 0.05 to 0.2 wt %.

5.6 Converting Methods

Conventional converting equipment can be used to convert the irradiated polyethylene resins with or without additional additives. However, it should be kept in mind that radiation modification drastically decreases the melt flow index of the polyethylene. Illustrative extrusion, injection molding, film blowing and powder coating processes, using preferred irradiated polyethylene resins, are set forth below:

For extrusion processes, the preferred irradiated HDPE (with or without additives) can be processed and converted using a conventional HDPE design screw. Care should be taken to ensure sufficient motor power for processing. A temperature profile should be chosen to ensure a melt temperature in the 220° C. to 255° C. range. The use of a hopper drier is highly recommended. If needed, the surface finish of the extruded product can be enhanced by increasing the temperature of the first section of the cooling bath to about 50° C.

For injection molding processes, the preferred irradiated HDPE (with or without additives) can be processed and converted using a conventional injection molder. Typical processing conditions are as follows: a melt temperature that ranges from 220° C. to 240° C.; an injection pressure (at the screw tip) up to machine maximum; a follow-up pressure (at the screw tip) of 50 MPa maximum; an injection rate usually at the maximum depending on the molding; a back pressure (at the screw tip) of 5 MPa to 30 MPa; a mold temperature ranging from 20° C. to 40° C.; and a mold clamping force greater than 2500 N/cm$^2$ projected molding area. However, the optimum molding conditions are dependent on a number of factors including article flow length, mold gating, mold cooling facilities, etc.

For film blowing, the preferred irradiated LLDPE (with or without additives) can be processed and converted to make a mono-layer film using conventional film blowing equipment. Typical film blowing conditions include: a temperature profile where the extruder is 190° C., the neck is 190° C., and the die is 190° C.; a die gap of 3.0 to 3.2 mm, preferably 3.1 mm (0.12"); and a blow-up ratio ranging from 2.4 to 2.5.

For powder coating, the preferred irradiated HDPE/LLDPE blend is compounded with antioxidant and, optionally, other additives. The blend is then pulverized to make a powder with a median particle size ranging from 20 to 600 microns, preferably from 70 to 400 microns. The powder is then coated onto a substrate, such as metal or plastic, using a either fluidized bed, spraying or sintering processes. Preferably, the coating thickness ranges from 0.1 to 5.0 mm and more preferably from 0.4 to 2.0 mm.

5.7 Illustrative Products

Irradiation of polyethylene under the conditions detailed herein enables the production of a number of useful artifacts. The following is an illustrative list of artifacts:

5.7.1 Extruded Pipes

Pipes can be extruded from irradiated polyethylene. Pipes extruded from irradiated HDPE exhibit a two-fold or greater increase in hydrostatic stress strength than pipes prepared from conventional HDPE. The irradiation process enables the formation of pipes of conventional wall thickness that can withstand higher internal pressures or, alternatively, pipes with less than half the conventional wall thickness that can withstand equivalent internal pressures. The latter pipes are less costly and easier to transport and handle than conventional pipes. This enhancement of hydrostatic stress strength is even more pronounced in the case of transporting fluids at elevated temperatures.

5.7.2 Molded Products

Molded products, such as injection molded luggage handles, clamps, and conveyor parts, can be made from irradiated polyethylene. Irradiated HDPE, for example, is an especially beneficial polyethylene for this purpose. Irradiated HDPE exhibits higher notched impact resistance than conventional HDPE, as well as superior stiffness and wear properties.

5.7.3 Extruded and/or Blown Films

Films of irradiated polyethylene, especially irradiated LLDPE, can be prepared that possess excellent puncture resistance as well as superior sealing strength. Unmodified LLDPE grades provide very good film properties but cannot be blown into films due to poor melt strength (i.e., the melt flow index is too high). The conventional remedy has been to blend LLDPE with LDPE, which has a much higher melt strength. The blend, typically comprising about 75% LLDPE and about 25% LDPE by weight, exhibits greater melt strength but only at the expense of film properties. Radiation induced crosslinking sufficiently increases the melt strength of LLDPE so that blending with LDPE and subsequent loss in film properties is no longer necessary (although it still may be desirable).

Specifically, un-irradiated LLDPE typically has a melt flow index ranging from 0.8 to 1.0 g/10 min. at 190° C. and 2.16 kg load. By radiation crosslinking, this melt flow index can typically be reduced to 0.3 to 0.5 g/10 min. at 190° C. and 2.16 kg load. The low melt flow index of irradiated LLDPE permits extrusion and/or film blowing of a mono film or laminate for applications ranging from agricultural greenhouse sheeting, dam liners and general industrial films to those such as bags for transporting liquids. The irradiated LLDPE can be employed alone or in conjunction with LDPE (un-irradiated or irradiated).

More specifically, Table 2 compares the properties of films made from an irradiated LLDPE/LDPE blend to films made from an un-irradiated LLDPE/LDPE blend.

TABLE 2

Properties Of Films Formed From Un-Irradiated and Irradiated LLDPE/LDPE Starting Materials

| Film Property | Standard | Films Formed From Un-irradiated LLDPE/LDPE | Films Formed From Irradiated LLDPE/LDPE |
|---|---|---|---|
| Thickness (μm) | N/A | 200 | 200 |
| Tensile Strength, MD (MPa) | ISO 527 | 13.63 | 29.54 |
| Tensile Strength, TD (MPa) | ISO 527 | 13.63 | 28.40 |
| Elongation at Break, MD (%) | ISO 527 | 756.02 | 1458.84 |
| Elongation at Break, TD (%) | ISO 527 | 968.27 | 1633.85 |
| Tear Resistance, MD (N/mm) | | 114.10 | 155.00 |
| Tear Resistance, TD (N/mm) | | 103.20 | 155.00 |

As evident from Table 2, films made from the irradiated materials exhibit more than twice the tensile strength and significantly enhanced tear resistance.

5.7.4 Powder Coatings

Irradiated polyethylene, especially, irradiated HDPE powder and blends thereof with LLDPE powder, exhibit excellent compatability and adhesion to metal (e.g., steel) and other polar materials including polar plastics. This enhanced compatability and adhesion is due to the formation of polar groups on the polyethylene by irradiation. Adhesion strengths in excess of 6.5 N/mm are obtained as measured by South African Bureau of Standards (SABS) 1217–1984, entitled The Production of Pained And Powder-Coated Steel Pipes, the entirety of which is incorporated by reference. The modified polyethylene is, therefore, an excellent interior and exterior protective coating for metal structures including pipe, structural steel and plastic surfaces. The increased compatability and adhesion means that the modified polyethylene is also more easily used in multi-layer film and sheet extrusions—often eliminating the need for intermediate adhesive layers. The polyethylene powders can be applied by standard powder coating techniques.

6.0 EXAMPLES 6.1 Example 1

Modified Resin For Injection Molding (Electron Beam)

BP Solvay A60-70-162, an HDPE with a density of 0.963 g/cm$^3$ and a melt flow index of 0.72 g/10 min (2.16 kg/190° C.), was used as the non-modified polymer. The polymerization of the resin involves a Cr-based loop slurry catalyst. The resin contains 500 ppm of phenolic antioxidant.

117 kg of A60-70-162 resin was irradiated with electron beam. The resin was irradiated under ambient atmosphere and temperature in 18 aluminum trays with a dimension of 16"×14"×12" (depth of each tray is 12"). 6.50 kg of resin were evenly spread in each tray. The electron beam accelerator utilized has an energy of 12 MeV and a beam power of 8 kW.

The surface dose was targeted at 8 kGy. Dose mapping was carried out using FWT (Far West Technology Inc.) dosimeter films located on the top, at ⅓ of the loading depth, at ⅔ of the loading depth and at the bottom, all located at the center of the tray. The surface dose applied was determined to be 8.7 kGy. The dose uniformity ratio (ratio of maximum dose to minimum dose) was determined to be 2.2. The average dose applied was calculated to be 8.6 kGy.

Identical samples of A60-70-162 resin were irradiated by electron beam at other dose levels, i.e., surface dose of 16 kGy and 24 kGy. The weight-average molecular weight ($M_w$) of all the samples were measured by GPC (Gel Permeation Chromatography).

FIG. 3 plots the $M_w$ of A60-70-162 versus surface does. As evident in FIG. 3, the $M_w$ increases with increasing surface radiation dose, indicating the occurrence of crosslinking and probably branching. Although the first data point shows an initial decrease, this is probably related to measurement uncertainty.

FIG. 4 plots the melt flow index (MFI) of A60-70-162 at 190° C. and under 10 kg load versus dose level. As shown in FIG. 4, there is a drastic decrease of melt flow index with increasing surface dose.

A masterbatch was prepared. Specifically, 117 kg of Dow's DMDA-8007 HDPE resin (with a density of 0.963 g/cm$^3$ and a melt flow index of 8.0 g/10 min at 2.16 kg/190° C.) was irradiated with electron beam using the same irradiation method set forth above. 81 kg of the irradiated resin was then mixed with 2.77 kg Irganox B225 antioxidant from Ciba Specialty Chemicals, extruded and pelletized to make the masterbatch. Care was taken to ensure sufficient motor power for processing. A temperature profile was chosen to ensure a melt temperature in the 220° C. to 255° C. range.

50 kg of the irradiated A60-70-162 resin above was mixed with 1.5 kg of the masterbatch above using a 55 gallon drum and a drum roller to blend for 6 hours.

The above resin blend, as well as un-irradiated A60-70-162 (as control), were injection molded on an 80-ton Shinwa machine (with single-stage, single screw) to make dog-bone and flexural sample bars (⅛" or 3.2 mm thick). The barrel temperature was 204° C. and the mold coolant temperature was 71° C. Packing and cooling time combined was 30 seconds per shot. The L/D ratio of the screw was approximately 20 to 1 and the compression ratio was approximately 2.5 to 1. The back pressure was low during the filling. Parts were filled using mold flow, primary injection pressure and injection speed as parameters. Secondary injection pressure was maintained until the gate froze and the part cooled enough to hold its integrity. The molder was purged several times before each run and a few extra sample bars were made with each run. Sample bars were successfully molded using both materials.

The sample bars were used to carry out tests for mechanical and thermal properties, etc. Table 3 shows the standards used and results obtained in the tests.

TABLE 3

Test Results For Electron Beam Modified Resin For Injection Molding

| Property | Unit | Standard | Un-irradiated A60-70-162 | EB Irradiated A60-70-162 |
|---|---|---|---|---|
| Melt Flow Index (190° C., 2.16 kg) | g/10 min | ASTM D-1238 | 0.75 | <0.10 |
| Melt Flow Index (190° C., 10 kg) | g/10 min | ASTM D-1238 | 10.7 | 1.1 |
| Tensile Strength @ Yield[a] | MPa | ISO 527 | 29 | 39 |
| Elongation @ Yield[a] | % | ISO 527 | 8 | 9 |
| Tensile Strength @ Break[a] | MPa | ISO 527 | 13 | 21 |

TABLE 3-continued

Test Results For Electron Beam Modified Resin For Injection Molding

| Property | Unit | Standard | Un-irradiated A60-70-162 | EB Irradiated A60-70-162 |
|---|---|---|---|---|
| Elongation @ Break[a] | % | ISO 527 | 106 | 20 |
| Izod Notched Impact Strength | kJ/m$^2$ | ISO 179 | 50* | 54* |
| Heat Deflection Temperature (HDT, 66 psi) | ° C. | ASTM D-648 | 74 | 87 |
| Oxygen Induction Time (OIT) | min. | ASTM D-3895 | 13.1 | 11.8 |

*Non-break failure, numerical numbers may be erroneous and are quoted for reference only Table 3 shows that after electron beam irradiation, the melt flow index drastically decreased. Some of the mechanical properties were improved. The heat deflection temperature (HDT) was raised. The oxygen induction time (OIT) did not have much of a drop, indicating that thermal stability did not deteriorate, probably due to the additional additives added through the masterbatch.

6.2 Example 2

Modified Resin For Injection Molding (Gamma Ray)

Dow's DMDA-8007, an HDPE with a density of 0.963 g/cm$^3$ and a melt flow index of 8.0 g/10 min (2.16 kg/190° C.), was used as the non-modified polymer. The polymerization of the resin involves a gas phase catalyst. The resin contains low concentration of antioxidant.

100 kg of Dow's DMDA-8007 HDPE resin was irradiated with gamma ray. The resin was irradiated under ambient atmosphere and temperature in 20 kg cardboard boxes, each having the dimensions of 16"×12.5"×10". The 16"×12.5" side was facing the irradiator so that the depth that gamma ray penetrated was 10". There was no dead space beyond the space among the pellets. The source activity was 2.2 MCi.

The minimum irradiation dose was targeted at 16 kGy. Dose mapping was carried out using FWT dosimeter films. A total of 23 dosimeter films were placed on different positions of the five 20 kg cartons and in the middle of the resin. The minimum dose was determined to be 16.6 kGy and the dose uniformity ratio was 1.5. The average of all doses at the 23 positions was calculated to be 21.4 kGy.

The number average molecular weight ($M_n$) and weight average molecular weight ($M_w$) for both gamma irradiated DMDA 8007 and the unirradiated control were measured by GPC. A GPC 2000V Waters instrument was used with a set of 3 columns (HT6E, HT6E, HT2). The analysis was done at a temperature of 135° C. in trichlorobenzene (TCB) and the injection volume was 215.5 mL. The universal calibration was performed with 12 PS standards, using the direct measured intrinsic viscosity with on-line viscometer. The molecular weight obtained for broad samples was verified with PE NBS 1475 standard, as the first and last sample in each sample set. Table 4 shows the $M_n$, $M_w$ and the $M_w/M_n$ (polydispersity) values for both materials.

TABLE 4

Molecular Weight And Distribution For Gamma Radiation Modified Resin

| Sample | $M_n$ (Daltons) | $M_w$ (Daltons) | $M_w/M_n$ |
|---|---|---|---|
| Un-Irradiated DMDA 8007 | 15600 | 103600 | 6.6 |
| Irradiated DMDA 8007 | 14200 | 143200 | 10.1 |

Table 4 shows a significant increase of $M_w/M_n$ after irradiation, which indicates a broadening of molecular weight distribution as a result of long chain branching and crosslinking of the polymer.

Large Amplitude Oscillatory Shear (LAOS) was measured for both gamma irradiated DMDA 8007 and the unirradiated control. FIG. 5 shows the shear stress vs. shear rate curves for both materials at 190° C. The broadening of the loop after irradiation indicates that long chain branching has occurred after the radiation modification.

Fourier Transform Infrared (FTIR) spectroscopy for both gamma irradiated DMDA 8007 (16 kGy) and the un-irradiated control was taken. FIG. 6 shows the carbonyl range of the spectra. As illustrated by FIG. 6, new bands appear in the carbonyl range of the spectra after gamma irradiation. The two bands located around 1741 cm$^{-1}$ and 1716 cm$^{-1}$ are assigned to carbonyl stretching vibration in ester groups and in ketones respectively. The small band that appears around 1698 cm$^{-1}$ is assigned to the acid end-group. The changes indicate that oxidation was induced by the irradiation and new carboxylic functional groups were introduced onto the polyethylene.

Next, 39 kg of the gamma irradiated HDPE was mixed with 1.2 kg of the masterbatch from Example 1 above to form a blend. Blending was accomplished using a 55 gallon drum and a drum roller for 6 hours.

The above resin blend and the un-irradiated DMDA-8007 resin were, separately, injection molded on an 80-ton Shinwa machine (with single-stage, single screw) to make dog-bone and flexural sample bars (⅛" or 3.2 mm thick). The barrel temperature was 204° C. and the mold coolant temperature was 71° C. Packing and cooling time combined was 30 seconds per shot. The L/D ratio of the screw is approximately 20 to 1 and the compression ratio is approximately 2.5 to 1. The back pressure was low during the filling. Parts were filled using mold flow, primary injection pressure and injection speed as parameters. Secondary injection pressure was maintained until the gate froze and the parts cooled enough to hold their integrity. The molder was purged several times before each running and a few extra sample bars were made with each running. Sample bars were successfully molded using both materials.

The sample bars were then used to carry out tests for mechanical and thermal properties, etc. Table 5 shows the standards used and results obtained in the tests.

TABLE 5

Test Results For Gamma Modified Resin For Injection Molding

| Property | Unit | Standard | Un-irradiated DMDA-8007 | Gamma Irradiated DMDA-8007 |
|---|---|---|---|---|
| Melt Flow Index (190° C., 2.16 kg) | g/10 min | ASTM D-1238 | 8.6 | 1.1 |
| Tensile Strength @ Yield[a] | MPa | ISO 527 | 28 | 30 |
| Elongation @ Yield[a] | % | ISO 527 | 8 | 8 |
| Tensile Strength @ Break[a] | MPa | ISO 527 | No Break | 15 |
| Elongation @ Break[a] | % | ISO 527 | >500 | 88 |
| Izod Notched Impact Strength | kJ/m$^2$ | ISO 179 | 6.1* | 55* |

TABLE 5-continued

Test Results For Gamma Modified Resin For Injection Molding

| Property | Unit | Standard | Un-irradiated DMDA-8007 | Gamma Irradiated DMDA-8007 |
|---|---|---|---|---|
| Heat Deflection Temperature (HDT, 66 psi) | ° C. | ASTM D-648 | 73 | 83 |
| Oxygen Induction Time (OIT) | min. | ASTM D-3895 | 3.6 | 5.9 |

*Non-break failure, numerical numbers may be erroneous and are quoted for reference only Table 5 shows that after gamma irradiation, the melt flow index drastically decreased. Mechanical properties were improved or remained the same. The heat deflection temperature (HDT) rose. The oxygen induction time (OIT) was increased, indicating that thermal stability was improved, probably due to additional additives added by the masterbatch.

6.3 Example 3

Modified Resin For Injection Molding (Gamma Ray)

A HDPE (Dow's C7260) was irradiated to a minimum absorbed dose of 16 kGy using gamma irradiation, employing bags containing 25 kg of polymer pellets. In addition, a masterbatch with Irganox B225 additive was made using the irradiated HDPE and this masterbatch was high-speed mixed into the irradiated polymer at a 3% masterbatch load.

The HDPE composition obtained exhibits a higher notched impact resistance than conventional HDPE, as well as superior stiffness and wear properties. Due to its low melt flow index, the irradiated HDPE composition is more suited to injection molding thicker rather than thinner artifacts. For example, the irradiated HDPE composition is well suited for injection molding luggage handles, clamps, and conveyor parts.

Various properties exhibited by the irradiated HDPE composition are set forth in Table 6.

TABLE 6

Properties Exhibited By This Modified HDPE

| Property | Value | Unit | Test Method | Test Specimen |
|---|---|---|---|---|
| Density at 23° C. | >0.950 | g/cm$^3$ | ISO 1183 | 10 mm × 10 mm × 4 mm |
| Melt Flow Index | | g/10 min | ISO 1183 | granules |
| I$_5$ | 16.0 | | | |
| I$_{21}$ | 3.5 | | | |
| Spiral Flow Length | 50–24 | cm | 1500 psi molding injection press | granules |
| Tensile at Yield | 25–30 | N/mm$^2$ | ISO 527 Test rate 50 mm/min | ISO 3167, 4 mm thick |
| Tensile Strength | 38 | N/mm$^2$ | ISO 527 Test rate 50 mm/min | ISO 3167, 4 mm thick |
| Flexural Modulus | 17 | N/mm$^2$ | ISO 527 Test rate 50 mm/min | ISO 3167, 4 mm thick |
| Hardness Shore-D | 66 | | ISO 868 | ISO 3167, 4 mm thick |
| Notched Impact Strength at 23° C. (acN) | 4–50 | kJ/m$^2$ | ISO 179/1eA | 80 mm × 10 mm × 4 mm |

This irradiated HDPE composition can be processed on conventional injection molders using the following processing conditions: (i) melt temperature between 220° C. to 250° C.; (ii) injection pressure (at the screw tip) up to the machine maximum; (iii) follow-up pressure (at the screw tip) of 50 MPa maximum; (iv) injection rate usually maximum, depending on the molding; (v) back pressure (at the screw tip) 5 MPa to 30 MPa; (vi) mold temperature ranging from 20° C. to 50° C.; and (vii) mold clamping force greater than 2500 N/cm$^2$ projected molding area.

6.4 Example 4

Modified Resin For Film Blowing (Electron Beam)

Mono films made entirely from LLDPE offer good puncture and tear resistance properties with superior environmental stress crack resistance (ESCR), but are difficult to process since they cannot be produced with a melt flow index less than about 0.8. Therefore, manufacturers use a mixture of 25% LDPE and 75% LLDPE in order to get satisfactory processability at the expense of material properties. However, radiation modified LLDPE offers the same or better processability and significantly improved tear resistance and puncture resistance over those of materials currently used. The resulting material is well-suited for thick film applications such as for greenhouses, dam liners, milk sachets and various industrial applications.

Dow's Dowlex 2045G, a LLDPE with a density of 0.920 g/cm$^3$ and a melt flow index of 1.0 g/10 min (2.16 kg/190° C.) was used as the non-modified polymer.

96 kg of Dowlex 2045G resin was irradiated with electron beam. The surface dose was targeted at 10 kGy. The resin was irradiated under ambient atmosphere and temperature in 18 aluminum trays with the dimensions 16"×14"×12" (depth of each tray was 12") with 5.34 kg resin evenly spread in each tray. The electron beam accelerator employed had an energy of 12 MeV and a beam power of 8 kW.

Dose mapping was carried out for a surface dose of 8 kGy using FWT dosimeter films on the top, at ⅓ of the loading depth, at ⅔ of the loading depth and at the bottom, all at the center of the tray. The surface dose was determined to be 8.4 kGy and the max./min. ratio was 1.2. The average dose was calculated to be 9.5 kGy.

Melt flow index (at 190° C. under 2.16 kg load) versus dose curves were obtained by irradiation of 5.34 kg Dowlex 2045G resin under the surface dose of 4, 8 and 16 kGy. FIG. 7 shows the decrease in melt flow index with each increase in surface dose. The optimal surface dose was determined to be 10 kGy from the melt flow index versus surface dose curve, targeting a melt flow index of around 0.3 g/10 min. after the irradiation.

The melt flow index at 190° C. under 10 kg load (Condition N in ASTM D-1238) was also measured for the un-radiated control resin and the resin irradiated at 8 kGy. Table 7 lists the measured melt flow indices at 190° C. under 2.16 kg and under 10 kg load, $I_2$ and $I_{10}$, respectively, as well as the ratio of $I_{10}/I_2$.

TABLE 7

Melt Flow Indices For Electron Beam Irradiated and Un-Irradiated LLDPE
(Measured by ASTM D-1238, Condition N)

| Material | $I_2$ | $I_{10}$ | $I_{10}/I_2$ |
|---|---|---|---|
| Dowlex 2045G Un-Irradiated | 1.01 | 7.69 | 7.61 |
| Dowlex 2045G EB Irradiated at 8 kGy | 0.41 | 4.57 | 11.1 |

The ratio of $I_{10}/I_2$ increased after irradiation, indicating an increase in the degree of long chain branching. The benefits derived from increased long chain branching are partially discussed in U.S. Pat. No. 6,114,486, the entire content of which is incorporated by reference.

To form a masterbatch, another 96 kg of Dow's Dowlex 2045G LLDPE resin was irradiated with an electron beam using the same irradiation method described above (at 10 kGy surface dose). 81 kg of the irradiated resin was mixed with 2.77 kg Irganox B900 antioxidant from Ciba Specialty Chemicals, extruded and pelletized to make the masterbatch. Care was taken to ensure sufficient motor power for processing. A temperature profile was chosen to ensure a melt temperature of about 190° C.

50 kg of the irradiated Dowlex 2045G resin was mixed with 1.5 kg of the masterbatch to form a blend. The blend was generated using a 55 gallon drum and a drum roller for 6 hours.

The above blend and the un-irradiated Dowlex 2045G resin (control) were used to blow films. A 1.5" diameter single screw extruder was used for plasticating the resin. At the end of the screw, a breaker plate with a 325-mesh screen was installed. A static mixer and a 4" diameter spiral mandrel die were installed inline with the extruder. The experimental conditions utilized are presented in Table 8.

TABLE 8

Film Blowing Experimental Conditions

| | | |
|---|---|---|
| Temperature | Zone 1 | 170° F. |
| | Zone 2 | 300° F. |
| | Zone 3 | 350° F. |
| | Zone 4 | 400° F. |
| | Die | 450° F. |
| Screw Speed | | 20 rpm |
| Die Pressure | | 1800 psi |
| Line speed | | 25 ft/min to 150 ft/min |
| Film thickness | | 0.001 in. (25 μm) and 0.005 in. (127 μm) |

The machine and the die were initially adjusted for a line speed of 25 ft/min. After collecting samples, the line speed was progressively increased at a speed of 25 ft/min. The bubble broke when the line speed was increased to 175 ft/min. 1 mil (25 μm) and 5 mil (127 μm) films of both resins were successfully produced.

The properties of 25 μm films made from both resins were examined. Table 9 lists some of the results.

TABLE 9

Properties of (EB) Radiation Modified LLDPE

| Property | ASTM | Irradiated Dowlex 2045G with masterbatch | Dowlex 2045G unirradiated control |
|---|---|---|---|
| Tensile at yield (MPa) MD* | D 882 | 23.8 | 9.8 |
| Tensile strength at break (MPa) MD | D 882 | 60.9 | 35.4 |
| Elongation at break (%) MD | D 882 | 640 | 600 |
| Tear strength (g/micron) MD | D 1004 | 13.2 | 7.0 |
| Tensile at yield (MPa) TD* | D 882 | 18.8 | 8.2 |
| Tensile breaking strength (MPa) TD | D 882 | 65.6 | 24.2 |
| Elongation at break (%) TD | D 882 | 770 | 670 |
| Tear strength (g/micron) TD | D 1004 | 15.4 | 7.7 |
| Puncture Strength (gram) | D1306 | 581 | 481 |

*MD is machine direction, TD is transverse direction Table 9 clearly indicates that the tensile strength, tear strength and puncture strength were significantly increased after the radiation modification.

6.5 Example 5

Modified Resins For Film Blowing (Gamma Ray)

As stated in the preceding example, manufacturers previously mixed LLDPE with LDPE to impart satisfactory processability at the expense of material properties. However, irradiated LLDPE offers the same or better processability and exhibits much better tear resistance and puncture resistance than those of material currently used.

An LLDPE (Sasol Polymers HF 12) was irradiated to a minimum absorbed dose of 8 kGy using gamma irradiation, employing bags containing 25 kg of polymer pellets. In addition, a masterbatch with the appropriate additives was made using the irradiated LLDPE, and this masterbatch was high-speed mixed into the irradiated polymer at a 3% masterbatch load.

The low melt flow index of the irradiated LLDPE allows extrusion as a mono film or laminate for applications ranging from agricultural greenhouse sheeting, dam liners and general industrial films to those such as bags for transporting liquids. The film has excellent puncture resistance as well as superior sealing strengths. Because of the superior melt strength of the modified polymer, it results in a very stable blown film during extrusion.

The properties of the irradiated LLDPE film are set forth in Table 10.

TABLE 10

Properties of Radiation Modified LLDPE

| Property | ASTM Test | Measurements |
|---|---|---|
| Density at 23° C. (g/cm$^3$) | D1505 | 0.922 |
| Melt flow index (2.16 kg/190° C.) (g/10 min) | D1238 | 0.4 |
| Tensile at yield (MPa) MD | D882 | 12.5 |
| Tensile at yield (MPa) TD | D882 | 11.7 |
| Tensile breaking strength (MPa) MD | D882 | 38.0 |
| Tensile breaking strength (MPa) TD | D882 | 37.0 |
| Elongation at break (%) MD | D882 | >1 000 |
| Elongation at break (%) TD | D882 | >1 000 |
| Tear strength (g/micron) MD | D1922 | 12.0 |
| Tear strength (g/micron) TD | D1922 | 22.0 |
| Impact resistance ($F_{50}$ g) | D1709 | >1200 |

6.6 Example 6

Modified Resins For Sheet Extrusion (Gamma Ray)

BP Solvay's K44-24-123, an HDPE with a density of 0.955 g/cm$^3$ and a melt flow index of 21.0 g/10 min (21.6 kg/190° C.) was used as the non-modified polymer. 100 kg of K44-24-123 HDPE resin was irradiated with gamma ray. The resin was irradiated under ambient atmosphere and temperature in 20 kg cardboard boxes with the dimensions 16"×12.5"×10". The 16"×12.5" side was facing the irradiator so that the depth that gamma ray penetrated was 10". There was no dead space beyond the space among the pellets. The source activity was 2.2 MCi.

The minimum irradiation dose was targeted at 16 kGy. Dose mapping was carried out using FWT dosimeter films. A total of 23 dosimeter films were placed on different positions of the five 20 kg cartons and in the middle of the resin. The minimum dose was determined to be 16.4 kGy and the dose uniformity ratio was 1.5. The average of all the doses at the 23 positions was calculated to be 22.0 kGy. The melt flow indices at 190° C./10 kg were 24.0 g/10 min. before the irradiation and 16.0 g/10 min. after the irradiation.

39 kg of the above gamma irradiated HDPE was mixed with 1.2 kg of the masterbatch from Example 1 using a 55 gallon drum and a drum roller for 6 hours.

A Welex single screw extruder was used to extrude 40 mil (1 mm) thick sheet from the above resin blend and the un-irradiated K44-24-123 resin (as control). The extruder had a 1.24" barrel feeding a 10" width sheet die. The die temperature was 204° C. Sheets were successfully extruded using both materials, despite the decrease in melt flow index.

6.7 Example 7

Modified Resins For Pipe Extrusion (Gamma Ray)

Dow's M9255F, an HDPE with a density of 0.953 g/cm$^3$ and a melt flow index of 8.5 g/10 min (21.6 kg/190° C.) was used as the non-modified polymer. The resin was irradiated under ambient atmosphere and temperature with gamma ray (source activity being 0.96 Mci) in 25 kg bags. The minimum absorbed dose was 16 kGy with a dose uniformity ratio of 1.30. Although the melt flow index decreased after irradiation, the spiral flow length exhibited little change (about 50 cm before and after irradiation).

The irradiated resin was subsequently compounded to add Irganox B225 antioxidant through a masterbatch using a similar method as described in Example 1 (the masterbatch was made from irradiated M9255F resin).

The modified and compounded polymer was used to extrude plumbing pipes with a 12.8 mm outer diameter and a wall thickness of 1.9 mm. The pipes were tested according to ISO 7628 Part 2 and South African standards SABS 1194: 1978, the entire contents of which are incorporated by reference. The test results are shown in Table 11.

TABLE 11

Test Results Of Pipes Made From Radiation Modified M9255F

| Property | Standardized Test | Result |
|---|---|---|
| Density at 23° C. (g/cm$^3$) | ISO 1183 | 0.950 |
| Melt flow index at 21.6 kg, 190° C. (g/10 min) | ISO 1183 | 3.5 |
| Spiral flow length (cm) |  | 26 |
| Tensile at yield (MPa) | ISO 527 | 30 |
| Notched impact strength (kJ/m$^2$) | ISO 179eA | 17 |
| Pipe diameter (mm) |  | 12.8 |
| Pipe wall thickness (mm) |  | 1.9 |
| Burst test at 23° C. (MPa) | ISO 7628 (7.2) | 9.74 |
| Burst test at 100° C. (MPa) | ISO 7628 (7.2) | 4.55 |
| Hoop stress at 23° C. (MPa) |  | 27.9 |
| Hoop stress at 100° C. (MPa) |  | 13.0 |
| Tensile breaking strength (MPa) | SABS 1194: 1978 | 27.4 |
| Elongation at break (%) | SABS 1194: 1978 | 506 |
| Cold impact resistance (−40° C.) | ISO 7628 (7.4) | No signs of cracking |
| Impact resistance (23° C.) | SABS 1194:1978 | No signs of cracking |
| Impact after ageing at 125° C. | ISO 7628 (7.5) | No signs of cracking |
| Moisture absorption at 100° C. | ISO 7628 (7.6) | <0.1% |
| Low temperature flexural at −40° C. (MPa) | ISO 7628 (7.7) | 9.52 |
| High temperature flexural at 100° C. (MPa) | ISO 7628 (7.8) | 10.03 |
| Stress cracking 60° C. (MPa) | ISO 7628 (7.9) | 9.87 |
| Resistance to ethanol (200 h) | ISO 7628 (7.10) | No signs of cracking |
| Resistance to battery acid (70 h) | ISO 7628 (7.11) | No signs of cracking |
| Resistance to oil (100° C. and 70 h) % change | ISO 7628 (7.12) | 3.98 |
| Burning rate (mm/min) | ISO 7628 (7.13) | 19.91 |
| Artificial weathering | SABS 1194: 1978 | Stabilized for 5 years |
| Hardness (Shore D) | ISO 868 | 66 |

Table 11 shows that the hydrostatic stress strength, expressed as hoop stress, both at ambient temperature (23° C.) and at 100° C. is much improved for the modified resin and, in fact, is at least double that of the non-modified polymer. This implies that the modification permits a pipe wall thickness reduction of up to one half that of the non-modified polymer, which has obvious safety and commercial advantages.

The hydrostatic stress strength (expressed as the hoop stress values) of the modified HDPE was compared to that of published values for pipes made from non-modified polymer as well as chemically crosslinked pipes. The results are shown below in Table 12 (all values in MPa).

TABLE 12

The Long-Term Hydrostatic Stress Strength (Hoop Stress) Of Radiation And Chemically Modified HDPEs

| Temperature (° C.) | Non-Crosslinked HDPE | Chemically Crosslinked HDPE | Pre-Crosslinked HDPE* |
|---|---|---|---|
| 23 | 12.4 | 12.5 | 17.4 |
| 80 | 5.5 | 6.0 | |
| 95 | | 5.0 | |
| 100 | | | 8.1 |
| 110 | | 3.5 | |

*Corrected by a safety factor of 1.6 for water pipes.

Table 12 shows that the hydrostatic stress strength of the radiation modified polymer not only surpasses that of the non-crosslinked polymer, but also surpasses that of chemically crosslinked polyethylene pipes (at ambient temperature by almost 40%). This enhancement is even more pronounced at 100° C., with relative improvements in excess of 150%. The particular hydrostatic stress strength of the radiation-modified polyethylene is clearly demonstrated; especially at elevated operating temperatures.

Thus, the modified polyethylene enables the formation of pipes of conventional wall thickness that can withstand much higher internal pressures or, alternatively, pipes with half the conventional wall thickness that are able to withstand equivalent internal pressures. The latter pipes are less costly and easier to transport and handle. This effect is even more pronounced in the case of transporting fluids at elevated temperatures.

The spiral flow properties are essentially unchanged, which indicates little impact on the ability to extrude the irradiated HDPE feedstock. Furthermore, the material is recyclable.

As an aside, it should be noted that the elevated melt strength of the modified polyethylene also makes it amenable to blow molding applications where a shaped mass with a much higher mass and strength can be manufactured. Accordingly, the material is ideally suited for blow molding very large containers.

6.8 Example 8

Modified Resins For Powder Coatings (Gamma Radiation)

In general, polyethylene exhibits very poor bonding to steel and other metals as well as other polar materials such as polar polymers. However, it has been discovered that polar groups (e.g., carboxylic acid groups) formed by irradiation impart polyethylene with excellent comparability and adhesion to steel and other polar materials, in excess of 6.5 N/mm. This increased compatability and adhesion makes irradiated polyethylene an excellent candidate for interior and exterior coating of steel pipes that carry water or food grade materials, oil and gas pipes, structural steel, extruded profiles, and a number of other coating applications. This increased compatability and adhesion also permits irradiated polyethylene to be used in multi-layer film and sheet extrusions without intermediate adhesive layers. Furthermore, it has been found that the irradiated polyethylene is easier to admix with polar organic and inorganic additives.

In this vein, a thermoplastic powder coating system based on polyethylene was developed for the protection of industrial steel structures and pipes. The polyethylene utilized was an irradiated LLDPE/HDPE blend. The LLDPE utilized was Sasol Polymers HR 411. The HDPE utilized was Dow C7260.

Specifically, a mixture of LLDPE (60%) and HDPE (40%) was compounded with an appropriate masterbatch containing all the required additives (UV absorbers, antioxidants and pigment) at a masterbatch concentration of 2.5% and palletized. The pellets were subsequently milled to a powder with an average size of 600 microns and bagged in 25 kg bags. The bagged powder was irradiated to a minimum absorbed dose of 16 kGy using gamma radiation.

The irradiated LLDPE/HDPE obtained was applied to steel using standard powder coating techniques. Specifically, the irradiated LLDPE/HDPE blend was coated simultaneously inside and outside the steel pipes in a fluidized bed at steel surface temperatures of about 240° C. No special pre-treatment of the steel was required and merely shot-blasting the steel to physically clean the surface rendered a coating with excellent adhesion and cathodic disbandment properties. Refurbishing old steel pipes can thus also be carried out employing this coating. The inherent abrasion resistance of the modified LLDPE/HDPE blend rendered a coating that was particularly well suited for protecting pipes transporting fluids containing abrasive particles, whereas the inherent inertness of polyethylene ensured an excellent protection against a chemically corrosive environment. The polymer and additives employed are classified as "food grades" and can be used in contact with potable water and foodstuffs. The powder coating imparted excellent corrosion and abrasion protection to the treated steel. Preliminary investigations reveal that similar protective coatings can be applied to other substrates including concrete and wood, employing flame spraying techniques.

Typical property values exhibited by irradiated LLDPE/HDPE steel pipe coatings made in this manner are set forth in Table 13.

TABLE 13

Property Values For Radiation Modified LLDPE/HDPE Steel Pipe Coatings

| Test | Standard | Units | Typical Value |
|---|---|---|---|
| Coating density | | kg/m$^3$ | >945 |
| Thermal Stability | | MFI change (%) | 4.8 |
| Adhesion to steel | SABS 1271–1984 | N/mm | 6.5 |
| Adhesion to polyethylene | | N/mm | 21.2 |
| Water absorption | | % after 100 h | 0 |
| Penetration resistance | | mm at 23° C. | 0.005 |
| | | mm at 70° C. | 0.102 |
| Tensile at yield | ISO 527 | MPa | 21.2 |
| ESCR* | | $F_{50}$ in hours | 47 |
| Impact resistance | | J | 20.4 |
| Cathodic disbondment | | Disbondment length (mm) | 8.6 |

*a modified medium density can be used to improve this value.

7.0 CONCLUDING REMARKS

7.1 Incorporation By Reference

All documents, including all patents, standards and patent applications, mentioned in this specification are incorporated by reference to the same extent as if each document was specifically and individually indicated to be incorporated by reference. No admission is made that any document cited herein is prior art.

7.2 Spirit of the Invention

Although the invention has been fully described, it will be apparent to one of ordinary skill in the art that many changes and modifications can be made without departing from the spirit the invention. Accordingly, the scope of the invention should be determined by the language of the claims and any equivalents thereof as defined by law.

What is claimed is:

1. A method of producing a feed stock comprising a modified polyethylene for use in a process for forming an artifact, film or coating comprising the following steps:
   (i) selecting a polyethylene having a crystalline phase and an amorphous phase, and where said polyethylene is a high-density polyethylene with a density ranging from 0.945 to 0.970 g/cm$^3$;
   (ii) imparting partial crosslinking, long chain branching and/or oxidation to the polyethylene by subjecting the polyethylene to a dose of ionizing radiation, where said dose is applied (a) when the polyethylene is at a temperature where both the crystalline and amorphous phases are present and (b) while the polyethylene is in an oxygen-containing atmosphere; and
   iii) adding one or more additives to the polyethylene after irradiation through a masterbatch.

2. The method of claim 1 where the total concentration of additives in the composition after irradiation ranges from 0.01 to 0.4 weight percent.

3. The method of claim 1 where the only additives added to the polyethylene after irradiation are antioxidants.

4. An artifact, at least one part of which is formed from a feed stock composition comprising a polyethylene irradiated by a method comprising the following steps:
   (i) selecting a polyethylene having a crystalline phase and an amorphous phase;
   (ii) imparting partial crosslinking, long chain branching and/or oxidation to the polyethylene by subjecting the polyethylene to a dose of ionizing radiation, where said dose is applied (a) when the polyethylene is at a temperature where both the crystalline and amorphous phases are present and (b) while the polyethylene is in an oxygen-containing atmosphere, and where the gel fraction of the polyethylene, after irradiation, ranges from 0.01 to 8%, by weight; and
   iii) optionally adding additives to the polyethylene after irradiation; where said artifact is a coated polar substrate and where said coating comprises an irradiated blend of linear low density polyethylene and high density polyethylene.

5. The artifact of claim 4, where said polar substrate is a metal substrate.

6. An artifact, at least one part of which is formed from a feed stock composition comprising a polyethylene irradiated by the method comprising the following steps:
   (i) selecting a polyethylene having a crystalline phase and an amorphous phase, and where said polyethylene is a high-density polyethylene with a density ranging from 0.945 to 0.970 g/cm$^3$;
   (ii) imparting partial crosslinking, long chain branching and/or oxidation to the polyethylene by subjecting the polyethylene to a dose of ionizing radiation, where said dose is applied (a) when the polyethylene is at a temperature where both the crystalline and amorphous phases are present and (b) while the polyethylene is in an oxygen-containing atmosphere; and
   iii) optionally adding additives to the polyethylene after irradiation; where said artifact is a molded artifact made by injection molding, blow molding, rotational molding or other molding methods.

7. An artifact, at least one part of which is formed from a feed stock composition comprising a polyethylene irradiated by the method comprising the following steps:
   (i) selecting a polyethylene having a crystalline phase and an amorphous phase, and where said polyethylene is a blend of high-density polyethylene with a density ranging from 0.945 to 0.970 g/cm$^3$ and linear low density polyethylene
   (ii) imparting partial crosslinking, long chain branching and/or oxidation to the polyethylene by subjecting the polyethylene to a dose of ionizing radiation, where said dose is applied (a) when the polyethylene is at a temperature where both the crystalline and amorphous phases are present and (b) while the polyethylene is in an oxygen-containing atmosphere; and
   iii) optionally adding additives to the polyethylene after irradiation; where said artifact is a coated polar substrate.

8. The artifact of claim 7, where said polar substrate is a metal substrate.

* * * * *